April 4, 1950     R. A. NORBOM     2,502,741
DUMP VEHICLE TILTING AND LOCKING
Original Filed Feb. 12, 1946     3 Sheets-Sheet 3
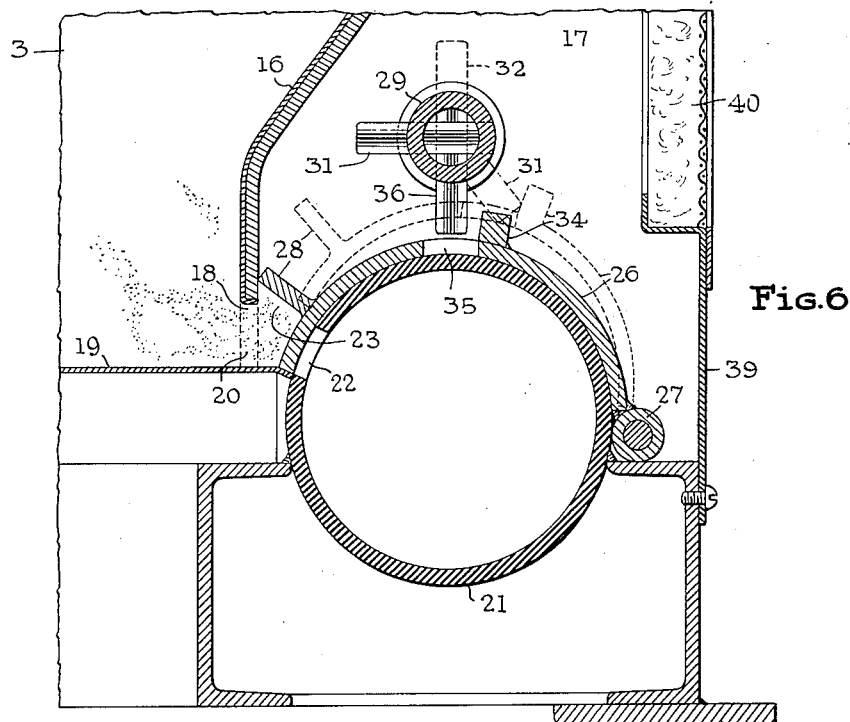
Fig.6
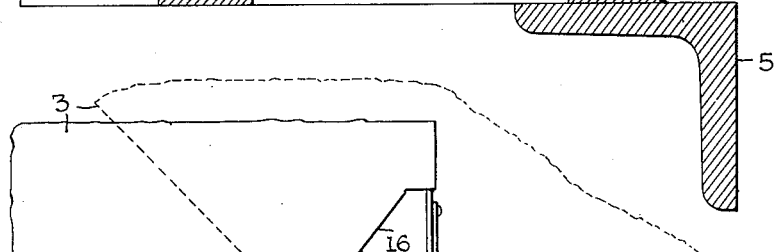
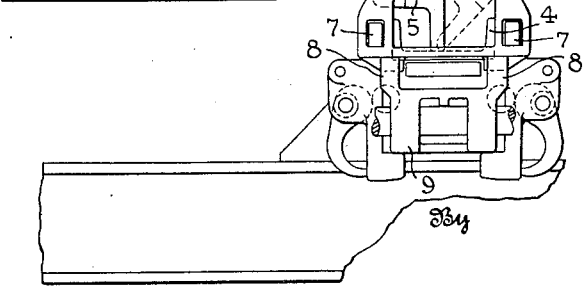
Fig.7
Inventor
Ragnar A. Norbom Patented Apr. 4, 1950

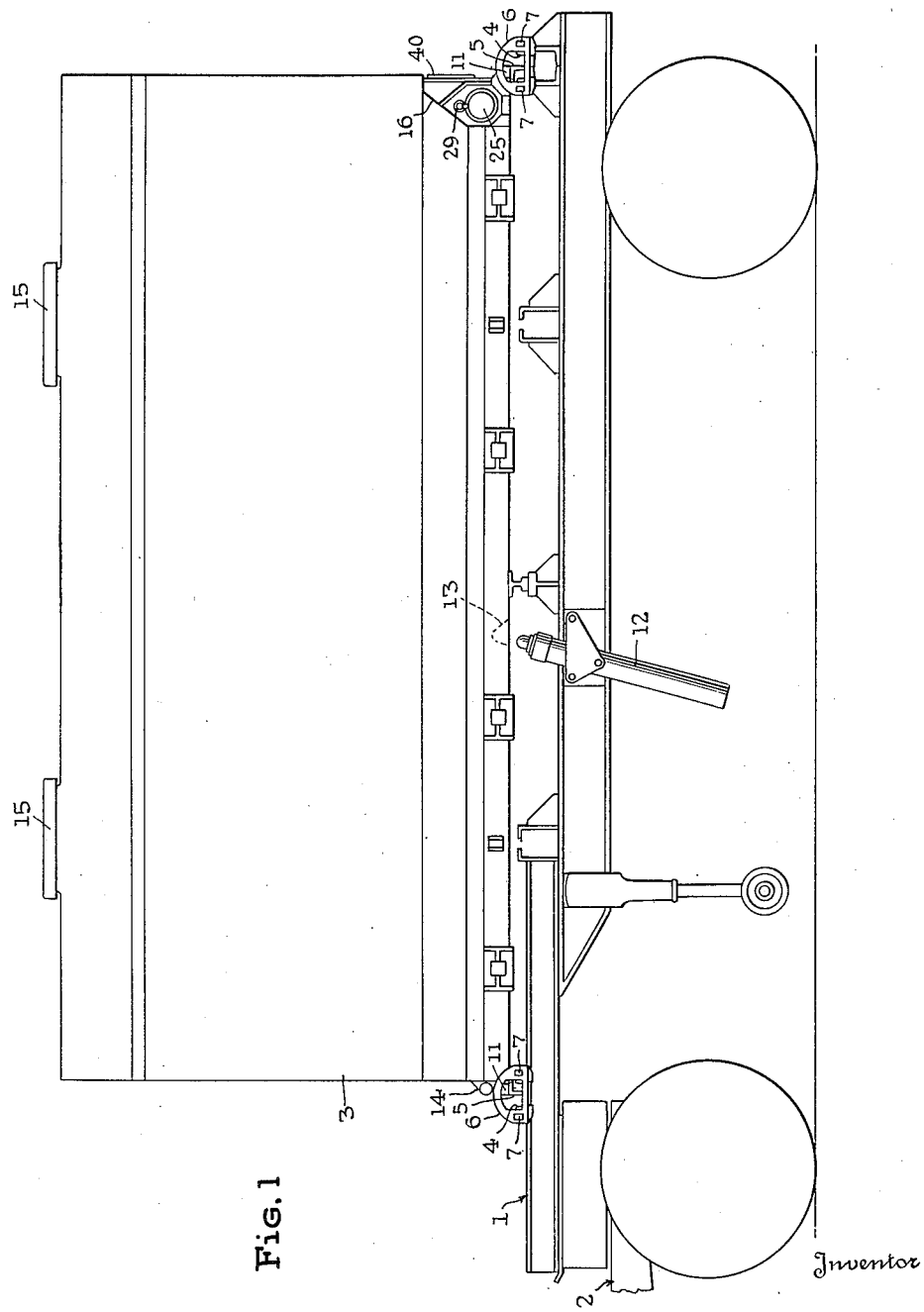

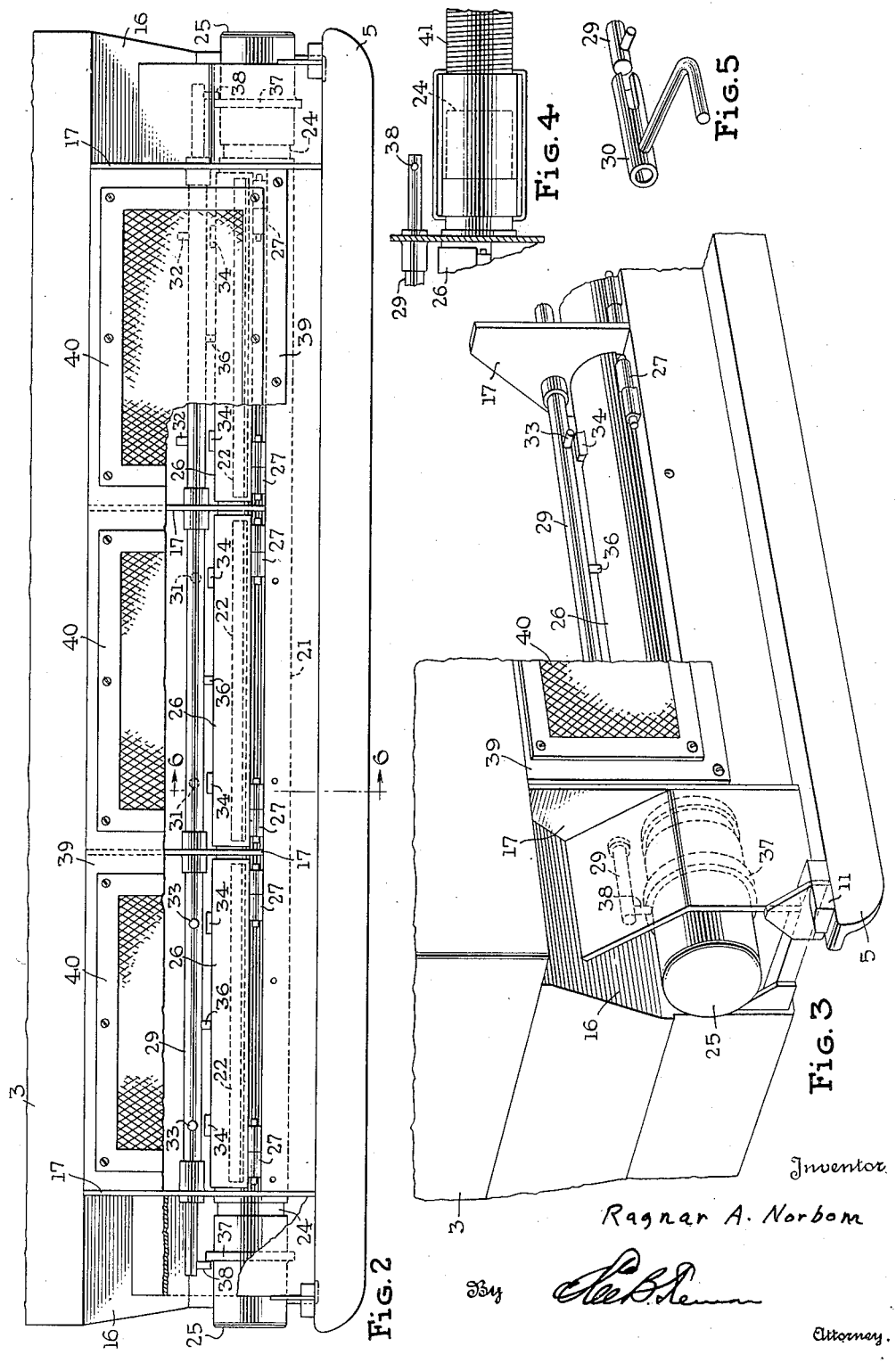

2,502,741

UNITED STATES PATENT OFFICE 2,502,741

DUMP VEHICLE TILTING AND LOCKING

Ragnar A. Norbom, New York, N. Y., assignor to National Fitch Corporation, a corporation of Delaware Original application February 12, 1946, Serial No. 647,060, now Patent No. 2,471,280, dated May 24, 1949. Divided and this application April 25, 1949, Serial No. 89,505

5 Claims. (Cl. 298—38)

This invention relates to means for transferring finely divided bulk material such as grain, powdered chemicals and minerals, and more particularly flour or other granulated or pulverized food products. This application is a division of my copending application Serial No. 647,060, filed February 12, 1946, now Patent No. 2,471,280, issued May 24, 1949. Many attempts have been made to transport such material, particularly flour, in bulk in large containers capable of being sealed substantially airtight and of a size suitable for loading only one or two upon a railway car or one upon an automotive transport vehicle, such as a truck or a semi-trailer. The advantages of transporting pulverized bulk material, and particularly flour, in such containers instead of in conventional sacks, bags or barrels are numerous. It would save much rehandling with resultant loss through breakage, overcome contamination hazards of moisture, vermin, and like nuisances, and result in a much more sanitary system of handling flour. Flour would be transported in such containers from the point of manufacture to the point of use, where the container itself could be employed for storage purposes.

All of the previous attempts to transport flour in large containers of the type above referred to have been unsuccessful because of the difficulty encountered in completely discharging the flour from the container. Many known arrangements for pneumatically discharging various kinds of finely divided material have been tried, but because of the peculiar characteristics of flour they have not been successful.

The object of this invention is to provide a container of the type above described, with improved means for pneumatically discharging the contents thereof in a minimum of time.

Another object of the invention is to provide pneumatic discharging means that will effect the complete removal of the bulk material, particularly flour, from the container.

Still another object of the invention is to provide container discharge means that eliminates the necessity of employing slope sheets in the interior corners of the container at the discharge end, in order to effect the complete removal of the bulk material therefrom.

A further object of the invention is to provide discharging means so constructed that discharge may be accomplished from either side of the container.

The means for accomplishing these objectives are hereinafter more fully explained in connection with the drawing and the essential novel features are summarized in the claims.

In the drawings which form a part of this specification:

Figure 1 is a side elevation of a semi-trailer on which is mounted a container having my improved discharge means.

Figure 2 is a fragmentary elevation of the discharge end of the container partially cut away to show more details of the discharge structure.

Figure 3 is a perspective view of a discharge corner of the container, partially cut away to show more detail of the discharge structure.

Figure 4 is a side elevation of the penumatic discharge hose operatively connected to the discharge outlet of the container.

Figure 5 is a perspective of the crank used to operate the discharge structure, and a portion of the actuating rod.

Figure 6 is a sectional view taken on line 6—6 of Figure 2.

Figure 7 is an enlargement of a portion of Figure 1 showing the detail of the stirrups which retain the rear skid rail of the container while the latter is being tilted, as indicated by the dotted lines.

Similar numerals refer to similar parts throughout the various views.

Referring to Figure 1, a semi-trailer, indicated generally by 1, is shown connected to a truck-tractor 2, the front part of which is not shown. A demountable container 3, in position to be transported, is shown loaded on the semi-trailer. The container is supported front and rear on two upwardly facing channel guideways 4 transversely mounted, in parallel, on the bed of the semi-trailer and engaging skid rails 5, correspondingly mounted on the bottom of the container. This transverse arrangement permits the container to be loaded onto the semi-trailer from the side, which facilitates the transfer of a container from a railway car to a semi-trailer and vice versa. As shown in Figure 7, the container is securely locked to the semi-trailer, to prevent movement of the former while in transit, by stirrups 6 which extend over the projecting ends of the skid rails and engage fingers 7 mounted on the ends of the guideways. The stirrups are held in position by projections 8 on a swinging bridge member 9. The locking mechanism thus far described is that disclosed and claimed in Patent No. 2,266,790 granted to me December 23, 1941. It will be noted that in this invention, however, the upper portion 10 of the main opening in the stirrups is arcuate in shape and cooperates with a similarly formed projection 11 on top of the projecting ends of the skid rails to permit turning of the skid rail within the stirrup when the container is tilted into the discharging position. Mounted upon the semi-trailer is a conventional lifting apparatus 12, which, after removal of the front stirrups, may be engaged with recess or socket 13 in the under frame of the container and operated to tilt the container about the fulcrum provided by the rear supporting members: the guideway 4 of the semi-trailer, the skid rail 5 of the container, and the stirrups 6. It should be noted that while the stirrups securely hold the container from translation in any direction, when the front stirrups are removed the rear ones permit the container to be rotated about a horizontal axis, because of the cooperation between arcuate portion 10 on the stirrups and arcuate portion 11 on the skid rails. This tilting of the container, which also may be accomplished by using a hoist attached to lifting hook 14 at the forward end of the container, is necessary to effect a complete discharge of the contents thereof, as is hereinafter described.

The container is of conventional shape having one or more filling openings at the top provided with sealing closures 15. The discharge means is located in a recess formed by an inwardly offset section 16 of the lower portion of one end wall, as is best shown in Figures 2, 3 and 6. The recess is divided into a center and two end compartments by vertically extending partitions 17. As shown in Figure 6, the lower end of the offset wall section 16 is cut away as at 18, in each compartment. These cut away portions, in cooperation with the container floor 19, which extends slightly beyond the lower end of the wall section 16, form outlet openings 20 extending substantially the length of each compartment. These openings afford communication between the interior of the container and each of the compartments. In the lower portion of the recess, and transversely extending through the compartments and the partitions is a suction discharge conduit or pipe 21 mounted against the outer edge of the floor 19 and having in each compartment a longitudinally extending slot 22, of the same length as, and in line with the corresponding openings 20 of the container end wall. The lower edge of the slots 22 is flush with the floor 19 of the container, while the top edge of the slots is slightly below the top of the openings 20, as shown in Figure 6. This mounting of the discharge pipe 21 forms passageways 23 between the pipe and wall section 16, which afford communication between the compartments and, through the slots 22, to the interior of the discharge pipe. The outer ends of the pipe form discharge outlets 24 having removable covers 25.

An arcuate closure or valve member 26, one in each compartment, is mounted over the discharge pipe and hinged at 27, from which point it extends around the discharge pipe to the edge of the floor 19, thereby, when in down position, covering and closing the slots 22. Flanges 28, longitudinally formed on the closure members 26 near the lip thereof, and extending substantially the length of each compartment and between the closure members 26 and the wall section 16, serve to block the passageways 23 when the closure members are in down position, as shown in Figure 6. It should be noted that the flanges 28 together with that portion of the closure members 26 extending beyond the flanges, serve as closures for the openings 20 as well as closures for the passageways 23 and the slots 22.

Mounted above and parallel to the discharge pipe is a closure actuating rod 29, mounted in bearings formed in the partitions 17 and extending somewhat beyond the partitions forming the outer wall of each end compartment. The actuating rod 29 is adapted to be turned by means of a crank 30, as illustrated in Figure 5. Radially projecting from the closure actuating rod are a series of closure actuating pins 31, 32 and 33 designed to contact the lugs 34 projecting from the top of the closure members 26. As best illustrated in Figure 2, two lugs 34 are provided on each closure member, one near each end thereof. Immediately adjacent to and on that side of the lugs away from the hinge 27 are pin clearance openings 35 in the closure members. These openings are necessary to provide clearance between the closure actuating pins and the top of the closure members when the latter are in the raised position shown by the dotted lines in Figure 6. In each compartment two closure actuating pins, radially in line, are provided on the actuating rod 29, corresponding to the two lugs 34 on the closure member in that compartment. The actuating pins in each compartment are radially offset on the rod 29 from those in other compartments. The arrangement, as illustrated in Figure 2, is such that when the rod 29 is turned, the actuating pins 31 in the center compartment contact the lugs 34 in that compartment. As the rod is turned further, the pins 32 in one end compartment contact the lugs 34 in that compartment. Further turning of the rod brings the pins 33 in the other end compartment into contact with the lugs 34 in that compartment.

In addition to the actuating pins on the closure actuating rod are closure lock pins 36, one centrally located in each compartment, and radially in line. These closure lock pins are radially offset from actuating pins 31, 32 and 33. After closure actuating pins 33 in one end compartment have contacted the lugs 34 in that compartment, further turning of the rod 29 brings the closure lock pins into the downward position shown in Figures 2 and 3. In this position, the closure lock pins extend nearly to the top surface of the closure members 26, and, since there are no corresponding pin clearance openings in the closure members, the latter are prevented from being raised. The removable covers 25 on the discharge outlets 24 of pipe 21 have a centrally located annular rib 37. On both ends of the closure actuating rod 29 are cover lock pins 38, radially extending in the same direction as the closure lock pins 36, and located outwardly of the annular rib 37 on the covers 25. The cover lock pins when in the position shown in Figures 2 and 3 extend inwardly of the annular rib to prevent removal of the discharge outlet covers.

The compartments are closed on the outer side by member 39 having mounted therein removable air filters 40, one for each compartment.

Having thus described the structure of my invention, the operation is as follows: With the discharge means in closed and locked position, as illustrated in Figures 2, 3 and 6, the container is filled with loose bulk material in any conventional manner and the filling opening closures 15 replaced. These closures preferably should be of a type that form a waterproof and dirtproof seal to prevent contamination of the contents of the container. The container may then be trans- ported by rail or automotive vehicle to its destination. Usually such transportation involves a rail trip with a short final stage by automotive vehicle, such as between a railroad freight yard and a bakery. In such case, the container, by means of its skid rails, is slid off a railroad flat car onto an automotive vehicle, where the container is locked to the vehicle by the stirrups 6, as illustrated in Figures 1 and 7. Upon arrival at the destination where removal of the contents of the container is to be effected, the front stirrups are removed and by means of the lifting apparatus 12, or any conventional hoisting means attached to the lifting hook 14, the container is tilted into a position best illustrated by the dotted lines in Figure 7. The tilting thus accomplished is necessary to provide gravity aid in effecting removal of the loose bulk material from the container. While in some respects loose bulk material has the characteristics of a fluid, it does not have all of the characteristics, and hence, is subject to packing and sticking. Therefore, inclined walls are necessary to make the loose bulk material flow to the discharge exit.

With the container thus in tilted position for removal of the contents, the crank 30 is attached to either end of the actuating rod 29 and the rod rotated through approximately 90°, thus freeing the annular rib 37 on the discharge outlet covers 25 from their locking pins 38 and allowing a cover to be removed from that side of the container from which discharge is to be effected. At the same time, the closure lock pins 36 are moved out of locking position to allow the closure members 26 to be raised. A flexible suction hose 41 is then attached to the discharge outlet 24, as illustrated in Figure 4. Further rotation of the rod 29, by use of the crank on that end of the rod opposite the hose 41, causes closure actuating pins 31 in the center compartment to contact the lugs 34 on the closure member 26, in that compartment, and cam the closure member into a raised position best shown by the dotted lines in Figure 6. The same dotted lines indicate that the clearance openings 35 in the closure members are necessary to allow clearance of the closure members with the actuating pins when the closure members are raised.

The raising of the closure member in the center compartment opens the slot 22 in the discharge pipe 21 and removes the longitudinal flange 28 from contact with the offset wall 16 to clear the passageway 23. The suction of the hose 41 is then established, and a current of air flows through the filter 40 of the center compartment, through the passageway 23, and through the slot 22 into the discharge pipe. This current flowing through the passageway 23 impinges on the material moving through the opening 20 by gravity action and agitates it, thus preventing sticking. When the direction of the air current is changed generally to that of the movement of the material to enter the slot 22, the current adds to the gravity action and drags the material along into the discharge pipe. At the same time, the negative pressure used to create the air current tends to suck the material through the opening 20 because the air pressure in the container just inside the opening is somewhat greater than that just outside the container opening. It is to be noted, however, that there is no increase in pressure within the container, particularly on top of the loose bulk material therein, which would tend to pack the material in the lower portions of the container and render evacuation more difficult. Since the current of air flowing through the passageways 23 turns to enter the discharge pipe 21, it flows through the slot 22 at an angle to the plane thereof thus causing a swirling action in the discharge pipe. This swirling action further agitates the loose bulk material in the pipe and thoroughly mixes it with the current of air. The mixture of air and loose bulk material is drawn through the discharge pipe into the suction hose and discharged wherever desired, e. g., into a storage bin. The air filters 40, serve to clean the air and thus prevent contamination of the loose bulk material with dust, moisture, and the like.

After all the material possible has been evacuated from the container through the opening 20 in the center compartment, the actuating rod is rotated further through 90°, disengaging the pins 31 from the lugs on the closure member in the central compartment and allowing the closure member both to drop and to be sucked back into closed position. At the same time, the actuating pins 32 in one end compartment will contact the lugs on the closure member in that compartment, thus raising it and allowing the loose bulk material to be withdrawn from that side of the container in the same manner as from the center. A further rotation of the actuating rod closes the closure member in that end compartment and opens the closure member in the other end compartment, thus withdrawing material from the other side of the container. The entire cycle may be repeated, if necessary, to insure complete evacuation of the contents of the container.

After the discharge operation has been completed, the discharged outlet cover is replaced and the actuating rod rotated to bring the closure lock pins and the cover lock pins in downward locked position. The outlet covers are again locked in place by the cover lock pins while the closure lock pins prevent the closure members from opening, either through the impact of the loose bulk material when the container is being filled or through vibration in transit.

It should be noted that the rod 29 may be turned only in the direction to open the closures in proper sequence because the reverse direction will cause the closure actuating pins to contact the lugs 34 from above and no further movement of the rod will be possible.

While I have shown and illustrated one specific embodiment of my invention, it is obvious that it is susceptible of various modifications. Instead of three chambers, two, four, or more could be employed. The order of evacuation through the various chambers could be varied. The number and location of closure actuating pins and closure lock pins could be changed, and various other modifications made. Accordingly, the spirit and scope of the invention is as set out in the appended claims. I have found in actual practice, however, that the structure as illustrated is an extremely efficient means of discharging flour or similar powdered material in a minimum of time, and with complete evacuation of the container. It is of particular advantage to employ suction instead of positive air pressure to move powdered bulk material. Positive air pressure has the tendency to pack such material and render difficult its removal, while negative air pressure takes advantage of the positive pressure already existing between the finely divided particles of the material, which when negative pressure is applied, tends to scatter such particles. The use of negative pressure also serves to retain in position the discharge outlet cover on the discharge outlet opposite that to which the suction hose is attached while evacuation is taking place. It also should be noted in my construction that the combined length of the three outlet openings 20 substantially equals the width of the container bottom thus assuring complete evacuation of the loose bulk material without the necessity of corner slope sheets to guide material to a single central outlet. Such corner slope sheets not only would lower the cubic capacity of the container, but also would require a more complicated container construction.

I claim:

1. The combination of a vehicle, a demountable container having a skid rail adapted to rest on said vehicle, a stirrup having an opening adapted to receive the projecting end of said skid rail, and means for fastening said stirrup to said vehicle to lock said container to said vehicle against translation, the projecting end of said skid rail and the opening in said stirrup being so shaped as to allow rotation of the skid rail within the opening in the stirrup and thus permit tilting of said container.

2. The combination of a vehicle, a demountable container having a skid rail adapted to rest on said vehicle, a stirrup having an opening adapted to receive the projecting end of said skid rail, and means for fastening said stirrup to said vehicle to lock said container to said vehicle against translation, the upper portion of the projecting end of said skid rail and the upper portion of said opening being correspondingly arcuate in shape to allow rotation of the skid rail within the opening in the stirrup and thus permit tilting of said container.

3. A vehicle having guideways to receive skid rails of a demountable container which may be carried by said vehicle and is adapted to be tilted for discharge of its contents, a stirrup having an opening adapted to receive a projecting end of a skid rail of a demountable container on said vehicle, and means on said vehicle engageable with said stirrup to retain the container on the vehicle, that portion of the edge of said opening in the stirrup which contacts the skid rail being arcuate in shape to permit tilting of a container about the skid rail while the former is retained on said vehicle.

4. A stirrup for retaining a demountable container on a vehicle, the container having skid rails adapted to be received in guideways on the vehicle, said stirrup having a central major opening to receive the end of a skid rail and a minor opening on each side thereof to receive retaining fingers mounted on the vehicle adjacent the end of a guideway, the upper edge of said major opening being arcuate in shape to permit tilting of the container about a skid rail while the former is retained on the vehicle.

5. The combination of a vehicle having spaced parallel guideways, a demountable container carried by said vehicle and having spaced parallel skid rails received in said guideways, detachable stirrups engaged with the projecting opposite ends of one of said skid rails and with said vehicle to retain said container thereon, the contacting portions of said stirrups and said one skid rail being arcuate in shape to permit said container to be tilted about said one skid rail while the former is retained on the vehicle, means for locking said stirrups to said container, and means on said vehicle for effecting the tilting of said container.

RAGNAR A. NORBOM.

REFERENCES CITED

The following references are of record in the file of this patent:

UNITED STATES PATENTS

| Number | Name | Date |
|---|---|---|
| 853,512 | Hendershot | May 14, 1907 |
| 2,023,700 | Rodler | Dec. 10, 1935 |